1

3,201,456
UNSATURATED ETHER ESTERS AND PROCESS FOR THEIR PRODUCTION
Wilbert H. Urry, Chicago, Ill., assignor to Monsanto Company, a corporation of Delaware
No Drawing. Filed Jan. 19, 1962, Ser. No. 167,422
5 Claims. (Cl. 260—476)

This invention relates to complex organic compounds not heretofore known and to a process for preparing same.

It is an object of this invention to provide unsaturated ether esters of the structure:

$$R_1-O-CH_2-\underset{\underset{O-R_2}{|}}{\overset{\overset{R_3}{|}}{C}}-\overset{R_4}{\underset{|}{C}}=CH_2$$

where $R_1$ is an alkyl group, $R_2$ is an acyl group and $R_3$ and $R_4$ are independently selected from the group consisting of hydrogen, a methyl radical and a halogen atom.

Another object of the invention is to provide a process for preparing unsaturated ether esters of the formula set forth above.

Other objects and advantages of the invention will be apparent from the following detailed description thereof.

The above and related objects are attained by reacting certain conjugated dienes with certain peroxide compounds in the presence of a cuprous salt. The dienes employed in the process conform to the formula set forth below:

$$CH_2=\overset{\overset{R_3}{|}}{C}-\overset{\overset{R_4}{|}}{C}=CH_2$$

where $R_3$ and $R_4$ are independently selected from the group consisting of hydrogen, a methyl group and a halogen atom. The peroxides employed in the process conform to the formula set forth below:

$$R_1-O-O-R_2$$

where $R_1$ is a tertiary alkyl group and $R_2$ is an acyl group selected from the group consisting of the acetyl group and the benzoyl group. In the process of the invention the product appears to arrive by the addition of the elements of the peroxide compound across the 1,2 position of the diene. This is an unusual reaction, since in most addition reactions involving conjugated dienes the addition takes place across the 1,4 position.

The following examples are set forth to illustrate more clearly the principle and practice of the invention to those skilled in the art. Unless otherwise noted, where parts or quantities are mentioned they are parts or quantities by weight.

*Example I*

A suitable reaction vessel is charged with 170 grams (2.5 mols) of isoprene, 0.5 gram of cuprous bromide and 1500 ml. of glacial acetic acid. The reaction mixture is heated to reflux and 194 grams (1 mol) of t-butyl perbenzoate are added dropwise over a two hour period. Heating is continued to maintain the reaction mixture at reflux and the reflux temperature increases from an initial value of 64° C. to a final value of 83° C. The reaction mixture is maintained at reflux temperature for four hours after the addition of the t-butyl perbenzoate is completed. The reaction mixture turns a deep green in color with the first addition of t-butyl perbenzoate.

After cooling to room temperature, the reaction mixture is dissolved in 3 liters of ether and washed with sodium carbonate solution to remove virtually all of the acid from the organic layer. The ether solution is washed twice more with water and dried over anhydrous magnesium sulfate. After removing the ether by distillation, the product is distilled under reduced pressure to obtain the following fractions:

| Fraction | Boiling Point | Weight, grams |
|---|---|---|
| 1 | 39–79° C. (7–10 mm. Hg) | 29 |
| 2 | 77–86° C. (7.5–10 mm. Hg) | 58 |
| 3 | 83–92° C. (7.5–10 mm. Hg) | 14 |
| 4 | 83–120° C. (7.5–10 mm. Hg) | 26 |

A small quantity of benzoic acid is recovered from the distillation pot.

The four fractions set forth above are combined and fractionated under reduced pressure using a column rated at 90 plates. A Compound (I) is isolated in the amount of 57 grams. This compound has a boiling point of 78–80° C. at 10 mm. Hg, a refractive index at 25° C. at 1.42414 and a density at 25° C. at 0.9180. The compound contains 65.8% carbon and 9.81% hydrogen. This analysis corresponds closely with the theoretical analysis for a compound of the empirical formula $C_{11}H_{20}O_3$. A second Compound (II) is obtained in the amount of 15 grams. This product has a boiling point of 85–86° C. at 10 mm. Hg, a refractive index at 25° C. of 1.42759 and a density at 25° C. of 0.9219. This compound analysis 65.4% carbon and 9.77% hydrogen. This analysis again compares well with theory for a compound of the empirical formula:

$$C_{11}H_{20}O_3$$

Vapor phase chromatograms of Compound (I) and (II) both show single peaks. Infrared spectra of both compounds show peaks corresponding to the following groups:

$$\overset{\diagdown}{\underset{\diagup}{C}}=CH_2$$

$$\overset{\diagdown}{\underset{\diagup}{C}}-O-O-\overset{\diagup}{\underset{\diagdown}{C}}$$

$$-\underset{\underset{O}{\|}}{\overset{|}{C}}-O-R$$

Nuclear magnetic resonance data establish the structure of Compound (I) to be:

$$CH_3-\underset{\underset{CH_3}{|}}{\overset{\overset{CH_3}{|}}{C}}-O-CH_2-\underset{\underset{O-\underset{\underset{O}{\|}}{C}-CH_3}{|}}{\overset{\overset{CH_3}{|}}{C}}-CH=CH_2$$

Nuclear magnetic resonate data establish the structure of Compound (II) to be:

$$CH_2=\underset{\underset{CH_3-\underset{\underset{O}{\|}}{C}-O}{|}}{\overset{\overset{CH_3}{|}}{C}}-CH-CH_2-O-\underset{\underset{CH_3}{|}}{\overset{\overset{CH_3}{|}}{C}}-CH_3$$

It will be noted that in the two formulae set forth immediately above the acid moiety of the ester group is derived from acetic acid. This is the result of ester interchange on the initially formed benzoate ester.

*Example II*

Compound (I) is heated with a methanol solution of KOH to obtain Compound (Ia) which is an unsaturated ether alcohol as shown in the formula below:

$$CH_3-\underset{\underset{CH_3}{|}}{\overset{\overset{CH_3}{|}}{C}}-O-CH_2-\underset{\underset{O-\underset{\underset{O}{\|}}{C}-CH_3}{|}}{\overset{\overset{CH_3}{|}}{C}}-CH=CH_2 \xrightarrow[KOH]{CH_3OH}$$

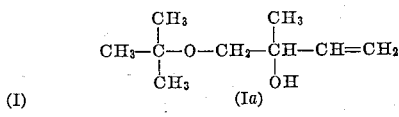

(I)              (Ia)

Compound (Ia) has a boiling point of 58–59° C. at 10 mm. Hg, a refractive index at 25° C. of 1.4321 and a density at 25° C. of 0.8669. A vapor phase chromatogram of this compound exhibits a single peak.

*Example III*

Compound (II) is heated with a methanol solution of KOH to give Compound (IIa) which is an unsaturated ether alcohol as set forth in the formula below:

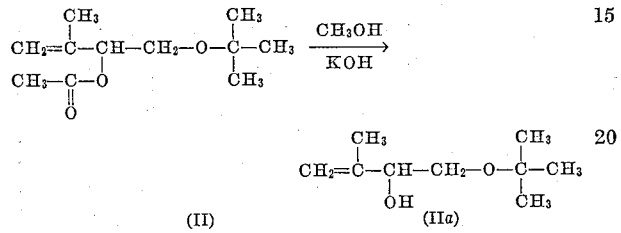

(II)              (IIa)

Compound (IIa) has a boiling point of 85–86° C. at 28 mm. Hg and a refractive index at 25° C. of 1.4323. The vapor phase chromatogram of Compound (IIa) shows a single peak. Compound (IIa) reacts with alpha-naphthyl isocyanate to give an alpha-naphthyl urethane. This reaction further confirms the structure assigned to Compound (II).

The conjugated diene reactant and the peroxide reactant employed in the process of the present invention conform to the structural formulae set forth earlier herein. Typical examples of the conjugated diene that can be employed include butadiene, isoprene, chloroprene, 2,3-butadiene, etc. Typical peroxides that can be employed are t-butyl perbenzoate, t-amyl perbenzoate, t-butyl peracetate, and diisobutyl peracetate.

A small quantity of a cuprous salt such as cuprous chloride, cuprous bromide, cuprous cyanide and the like is employed in the recation as a catalyst. Only trace quantities of the cuprous salt are required, e.g., less than 1% based on the weight of the conjugated diene reactant.

The reaction is preferably carried out in highly polar organic solvents such as tetrahydrofuran or an organic acid such as glacial acetic acid, propionic acid, etc. The reaction is normally carried out at an elevated temperature, e.g., at 40° C. or above, and preferably in the range of 50–150° C.

The compounds of the invention are unsaturated ether esters which have a very pleasant odor. Consequently, they may be used in the formulation of perfumes or can be used as odor masking agents. The compounds also can be used as intermediates in the preparation of other useful compounds such as unsaturated ether alcohols as illustrated in Examples II and III.

The above descriptions and particularly the examples are set forth for purposes of illustration only. Many variations and modifications thereof will be apparent to those skilled in the art and can be made without departing from the spirit and scope of the invention herein described.

What is claimed is:

1. Unsaturated ether esters of the formula:

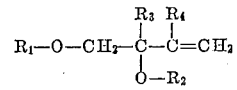

where $R_1$ is a tertiary alkyl group selected from the group consisting of tertiary butyl, tertiary amyl and diisobutyl, $R_2$ is an acyl group selected from the group consisting of an acetyl group and a benzoyl group and $R_3$ and $R_4$ are independently selected from the group consisting of hydrogen and a methyl radical.

2. An unsaturated ether ester of the formula:

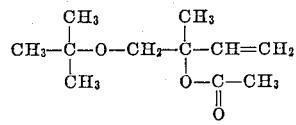

3. An unsaturated ether ester of the formula:

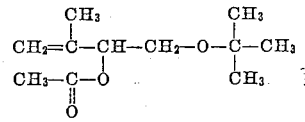

4. A process for preparing unsaturated ether esters of the formula:

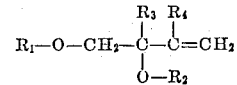

where $R_1$ is a tertiary alkyl group selected from the group consisting of tertiary butyl, tertiary amyl and diisobutyl, $R_2$ is an acyl group selected from the group consisting of an acetyl group and a benzoyl group and $R_3$ and $R_4$ are independently selected from the group consisting of hydrogen and a methyl radical which comprises heating a conjugated diene of the formula:

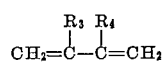

where $R_3$ and $R_4$ are independently selected from the group consisting of hydrogen and a methyl group with a peroxide of the formula:

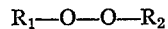

where $R_1$ is a tertiary alkyl group selected from the group consisting of tertiary butyl, tertiary amyl and diisobutyl and $R_2$ is an acyl group selected from the group consisting of the acetyl group and the benzoyl group to a temperature of 40° C. to 150° C. in an organic solvent and in the presence of a cuprous salt.

5. The process of claim 4 in which the conjugated diene is isoprene, the peroxide is t-butyl perbenzoate, and the cuprous salt is cuprous bromide.

No references cited.

LORRAINE A. WEINBERGER, *Primary Examiner.*
TOBIAS E. LEVOW, LEON ZITVER, *Examiners.*